United States Patent [19]

Culp

[11] Patent Number: 5,593,351

[45] Date of Patent: *Jan. 14, 1997

[54] AXIALLY STIFF LINK

[76] Inventor: Gordon W. Culp, 13832 Haynes St., Van Nuys, Calif. 91401

[ * ] Notice: The terminal 8 months of this patent has been disclaimed.

[21] Appl. No.: 405,411

[22] Filed: Mar. 15, 1995

Related U.S. Application Data

[63] Continuation of Ser. No. 208,505, Mar. 10, 1994, abandoned, which is a continuation of Ser. No. 909,521, Jul. 6, 1992, abandoned.

[51] Int. Cl.⁶ .................................................. F16D 3/16
[52] U.S. Cl. .......................... 464/114; 403/74; 403/291; 464/112; 464/147
[58] Field of Search .................. 403/57, 58, 74, 403/222, 113, 117, 119, 335, 338; 464/106, 112, 113, 114, 119, 128, 132, 32, 147, 185, 81

[56] References Cited

U.S. PATENT DOCUMENTS

| | | | |
|---|---|---|---|
| 430,267 | 6/1890 | Boub | 403/74 |
| 1,281,918 | 10/1918 | Ecaubert | 464/114 |
| 3,073,630 | 1/1963 | Kuhn | 403/57 |
| 3,087,314 | 4/1963 | Jarvis | 464/128 |
| 3,405,540 | 10/1968 | Johnson | . |
| 3,975,923 | 8/1976 | Grimpe | 464/32 |
| 4,496,331 | 1/1985 | Atkin | 464/106 |
| 4,565,541 | 1/1986 | Obrecht | 464/106 |
| 4,643,699 | 2/1987 | Taig | 464/112 |
| 4,840,601 | 6/1989 | Denman | 403/57 |
| 5,102,255 | 4/1992 | Heinz | 403/291 |
| 5,205,789 | 4/1993 | Falgout | 403/57 |

*Primary Examiner*—Daniel P. Stodola
*Assistant Examiner*—Eileen A. Dunn

[57] ABSTRACT

The axially stiff link provides a rigid connection linking two shaft segments (1, 2) of a shaft such that it can bend and or twist yet remain rigid which no slop for high tolerance positioning applications. The link is composed of two rolling elements (4) attached to the shaft segments (1, 2) having a rolling line contact (10) with each other. The rolling elements (4) are held together and preloaded by a ring spring (6) which encircles a portion of the rolling element extending transversely from the shaft segment and engages it by rolling line contact (8). The rolling elements may be solid plain curved portions of the shaft ends, a cylindrical bar, cylindrical bar pairs, or conical pairs to provide for torsional as well as axial bending in the link. Closely spaced perpendicularly disposed axial links provide for two axis bending of the shaft.

7 Claims, 3 Drawing Sheets

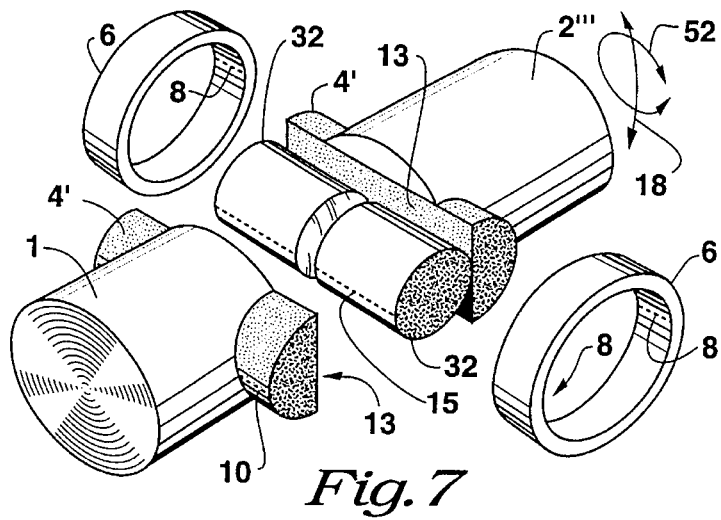
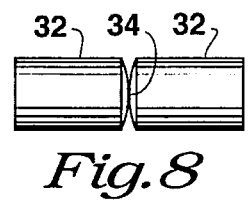
Fig. 8
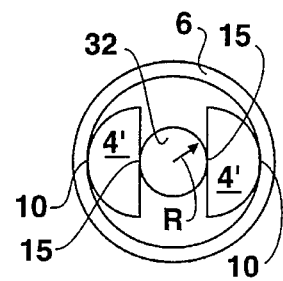
Fig. 7
Fig. 9
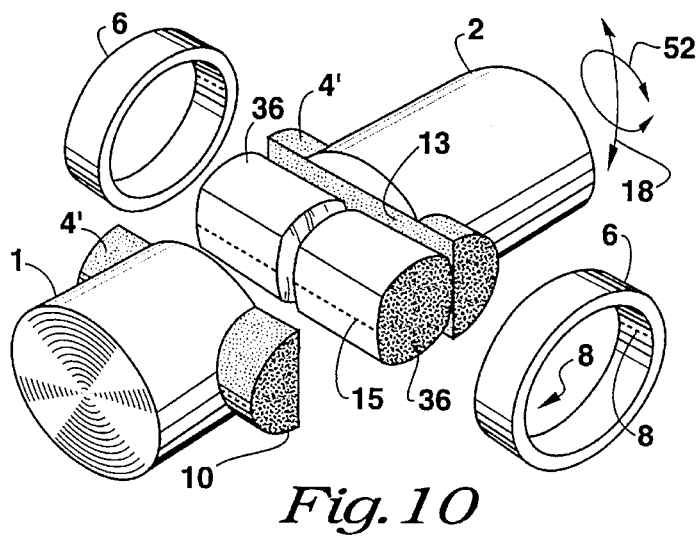
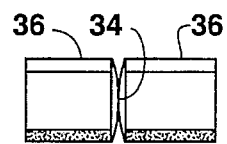
Fig. 11
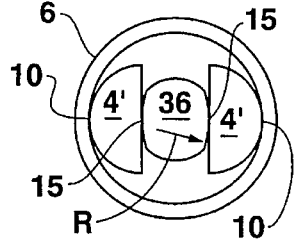
Fig. 10
Fig. 12
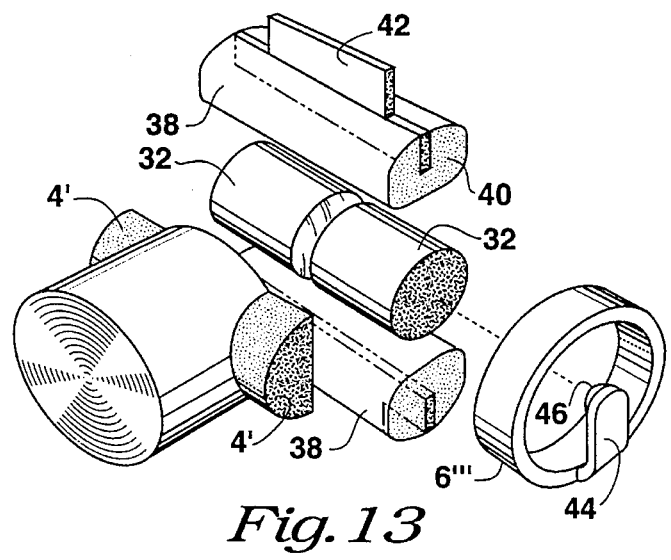
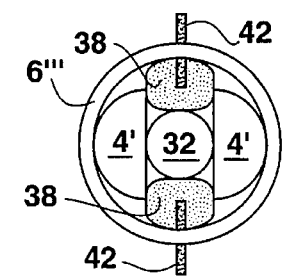
Fig. 13
Fig. 14

5,593,351

AXIALLY STIFF LINK

This is a continuation of application Ser. No. 08/208,505 filed on Mar. 10, 1994, now abandoned, which is a continuation of application Ser. No. 07/909,521 filed on Jul. 6, 1992, now abandoned.

FIELD OF THE INVENTION

This invention relates to a link permitting kinematically stable rotations of high compliance while maintaining low axial link compliance, and more specifically to elbow joints, swivel joints and joints permitting both elbow and swivel movements for use in optical and precision instruments.

DESCRIPTION OF THE RELATED ART

In the past axially stiff links have used various techniques to provide high tension in the link while maintaining the ability to bend on an axis. Some links use a wire down the center of the link to provide tension. Others use housings which screw together and enclose the link to provide stiffness.

The devices in the past have used hertzian contact points which entail large stresses near contacting surfaces and provide an elastic stiffness that varies with contacting normal load.

Other devices use ball and socket systems having large curved contact areas at the joint. Ball and socket designs have a large surface area of contact with frictional sliding contact.

SUMMARY OF THE INVENTION

The present invention uses non-Hertzian rolling line contact in order to achieve high axial link rigidity and to apply negligible moments to the link during actuation. Ring springs with rolling line contact maintain a high mutual rolling line contact force of each link joint while causing a negligible moment at the link joint. Paired rolling elements incorporate both hinging and torsional rotation within a link joint.

OBJECTS OF THE INVENTION

An object of the invention is to provide jointed mechanical linkage with very high axial rigidity.

Another object is a linkage which applies negligible bending moments to linked objects.

A further object is a simple, easily adjusted but essentially frictionless joint preloading means.

Yet another object is a link to allow torsional movement of, while applying negligible torsional forces to, linked objects.

Other objects of the invention are to provide: high axial stiffness; high bending compliance; low friction rolling line contact for long life; large tension with very large compression; kinematic stability with predefined radius and link lengths; self alignment; easy assembly; simple manufacture; and low cost.

Other objects, advantages and novel features of the present invention will become apparent from the following detailed description of the invention when considered in conjunction with the accompanying drawing.

BRIEF DESCRIPTION OF THE DRAWINGS

FIG. 7 shows an exploded view of an axially stiff link.

FIG. 8 shows a face view of the two contacting cylinder rolling elements of FIG. 7.

FIG. 9 shows an end view of the shaft rolling element of FIG. 7.

FIG. 10 shows an exploded view of an axially stiff link with a large radius rolling element.

FIG. 11 shows a face view of the two contacting large radius rolling elements of FIG. 10.

FIG. 12 shows an end view of the shaft rolling element of FIG. 10.

FIG. 13 shows an exploded view of an axially stiff link with a stabilizing bar.

FIG. 14 shows an end view of the shaft rolling element of FIG. 13.

DETAILED DESCRIPTION OF THE PREFERRED EMBODIMENT

Figure 1:
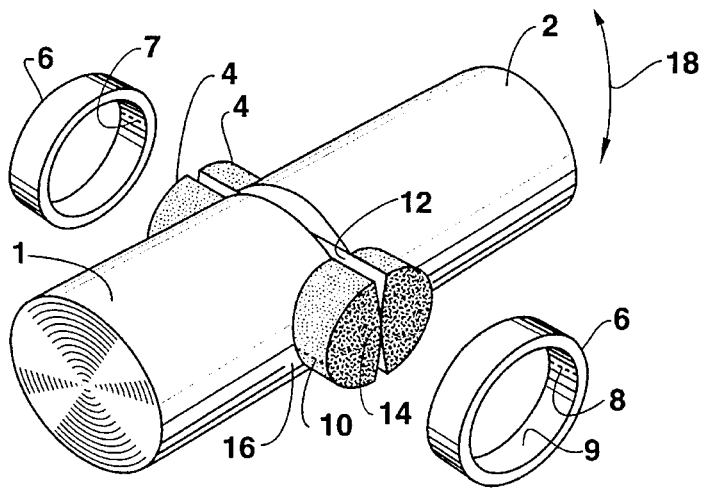
FIG. 1 shows a perspective view of an axially stiff link.

FIG. 1 shows an exploded view of a link comprising two similar shaft segments 1 and 2. Each segment has affixed to one end a shaft rolling element 4 which contacts the mating shaft rolling element at line contact 14 on a surface portion of cylindrically curved surface 12. Portions of shaft rolling elements 4 external to shafts 1 and 2 are axially compressed together by ring springs 6. Each ring spring 6 has two rolling line contacts 8 which roll on line contact 10 of the external portions of paired shaft rolling elements 4. Rolling at line contact 14 allows shaft segment 2 to rotate relative to shaft segment 1 in directions indicated by arrow 18.

Figure 2:
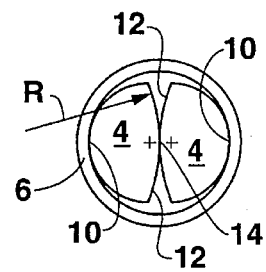
FIG. 2 shows an end view of the shaft rolling element of FIG. 1.

FIG. 2 is an end view of the shaft rolling elements 4 of FIG. 1 of which surface 12 may have a circular radius R, but said surface need not be a portion of a cylinder. Each ring spring 6 is deformed during installation from its free circular shape to the shape of an ellipse. As member 4 rotates, rolling line contact occurs at five places simultaneously, four at the ring spring-shaft rolling element interfaces 10 and one at line contact 14 between the shaft rolling elements. A predetermined radius of curvature at the line contact surfaces 14 results in negligible change in the lengths of the semimajor axis of the elliptical shape of the ring springs 6. For the small link articulation angles commonly encountered in optical instruments, the ring springs exert an axial force on line contact 14 which is essentially independent of said angles.

Circular (when free) ring springs 6 are depicted because they are easily made from tubing, but ring springs with non-circular shape may be used to reduce contact stress between the ring spring inner surface 9 and the shaft rolling element by increasing the contact radii of both parts.

In a link having two or more joints, wherein a link has a joint composed of shaft rolling elements 4 with a radius of curvature R which is greater than the distance to the furthest compliant joint of the link, the link is kinematically stable. When the radius R is equal to the distance of the next joint there will be no resultant moment at the joint and the link will be conditionally stable. The equal-radius geometry will be kinematically stable when the link is critically damped by external means in the plane of the articulation, such means being obvious to those conversant with mechanism arts. When the radius R is less than the distance to the next joint in the link the link will be unstable.

A small residual moment will be generated in the joint which is proportional to the angular joint motion when the radius R differs from that of the distance to the next joint. Optical element positioning applications generally allow a small moment, thereby allowing a choice of radius R that provides kinematic stability of the link.

Curving the surface 12 of shaft rolling element 4 at contact 10 in the shape of a volute which is more curved than a circle will cause a shortening of the semimajor axis of the ring spring 6 when the joint is flexed, while a large radius at contact 14 will lengthen the semimajor axis of the otherwise circular ring spring. The radius R is chosen first to have the desired degree of kinematic stability, then the curvature of contact 10 is selected which maintains the desired angular independence of axial force of the ring spring. The compressional force supplied by the ring spring may therefore be essentially independent of joint flexure.

Noise and friction are minimized at four possible contacts 16 between ring spring 6 and shaft segments 1 and 2 by beveling the inner end 7 of each ring spring in order to reduce contact 16 to essentially a small-area edge and a cylindrical surface respectively, the location of said contact lying at a vanishingly small moment arm from the rolling contact 10. The vanishingly small moment arm causes a vanishingly small moment of the joint due to friction at contact 16.

An axially stiff link is easily made by boring a round hole through a metal shaft (the shaft segment) into which is brazed a tungsten carbide rod (the shaft rolling element). The shaft rolling element material is selected to match as closely as practical the thermal expansion of the shaft segment. After brazing, portions of the shaft rolling element 4 and the shaft segment 1 and 2 are removed leaving the desired plain curved surface 12. The axially stiff link is then assembled by squeezably installing each ring spring using pliers the jaws of which externally bear at points equidistant from the rolling contact locations of the shaft. Slight working of the joint then aligns all of the parts except in a direction parallel to line contact 14. Alignment of the rolling parts occurs because the aligned state stores the least elastic potential energy.

Figure 3:
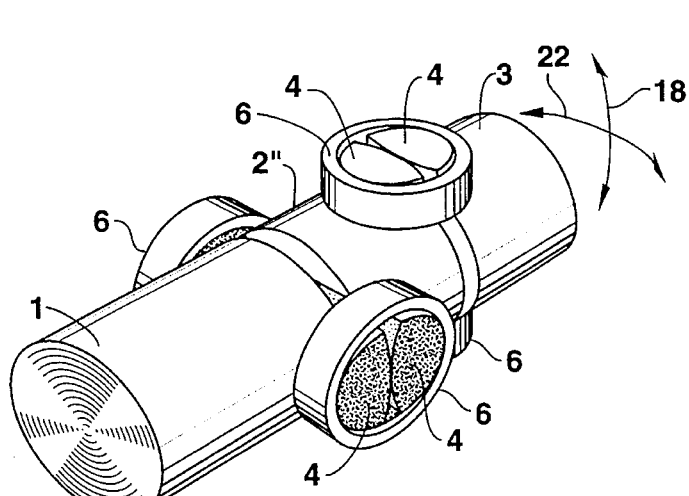
FIG. 3 shows a perspective view of a two axis axially stiff link.

Referring to FIG. 3, two joints of FIG. 1 are perpendicularly incorporated between shaft segments 1, 2" and 3 to provide two degrees of link bending freedom indicated by arrows 18 and 22. The two pair of shaft rolling elements 4 may lie closer together than shown in the figure in order to approximate a single-point pivot such as a hemisphere rolling on a plane or two compound convex surfaces in contact. Sufficient separation of the two joints is necessary to prevent mutually induced bending compliances in the rod-like inserts and in the shaft segment 2.

A pair of rolling line contacts as depicted in FIG. 3 is compared with a spherical contact in Table 1 using two preload conditions, the properties being derived from Table 33, Cases 2 and 1, respectively, of *Formulas for Stress and Strain* by R. J. Roark and W. C. Young, 5th edition, McGraw-Hill Book Co., 1975. In this example, contacting shaft parts are of tungsten carbide, curved portions have 2-inch radii, and the length L of the cylindrical contact is 0.5 inch. The compared links have a 0.5-inch nominal shaft diameter. The Table also shows the relations between link joint geometry and contact properties, where H is the Hertzian Modulus related to the physical properties of the contacting materials, ln is the logarithm to the base e, and c is a constant.

TABLE 1

| Property | Sphere/Plane | Cylinder/Plane |
| --- | --- | --- |
| Normal Load P, lbs | 20 | 20 |
| Contact Size b, inch | 0.017 diameter | 0.003 width |
| Contact(s) deflection y, μin. | 37 | 4 |
| Springrate, lbs/μin. | 0.8 | 5.08 |
| Subsurface Compressive Stress | 128,000 psi | 17,000 psi |
| Normal Load P, lbs | 200 | 200 |
| Contact Size b, inch | 0.037 diameter | 0.09 width |
| Contact deflection y, μin. | 174 | 38 |
| Springrate, lbs/μinch | 1.73 | 6.05 |
| Subsurface Compressive Stress | 275,000 psi | 54,000 psi |
| Contact Width b, full | $R^{1/3}P^{1/3}H^{-1/3}$ | $R^{1/2}P^{1/2}H^{-1/2}L^{-1/2}$ |
| Contact Deflection y | $R^{-1/3}P^{2/3}H^{-2/3}$ | $P^1H^{-1}L^{-1}$ ln $cRHLP^{-1}$ |
| Compliance, Axial | $R^{-1/3}P^{-1/3}H^{-2/3}$ | $H^{-1}L^{-1}$ ln $cRHLP^{-1}$ |
| Subsurface Compressive Stress | $R^{-2/3}P^{1/3}H^{1/3}$ | $R^{-1/2}P^{1/2}H^{1/2}L^{-1/2}$ |

As is obvious from Table 1, the cylindrical contact pair at a 20-lbs load is six times more rigid than the spherical contact, both having about the same dimensions. The sphere is under a compressive subsurface stress which allows an average fatigue life of $10^8$ rolling cycles in tungsten carbide, while the cylinder contact is lightly stressed.

At a load of 200 lbs the stiffness of the spherical contact has doubled, while the stiffness of the pair of cylindrical contacts has only increased by about 19% from the initial high value. The spring constant or compliance of the rolling line contact is nearly independent of joint preload, allowing near-linear joint properties when axial forces are created in the link due to the inertial reaction forces due to dynamic positioning of the linked objects. The stiffness of the cylindrical contact pair is still 3.5 times greater than the single spherical contact. At 200 lbs load, stress on the spherical contact has risen to a value where fatigue life would be unacceptably short for most dynamic instrument linkage applications, while the cylindrical contacts are still lightly stressed.

Figure 4A:
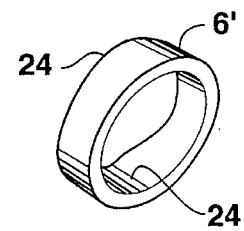
FIG. 4a shows a perspective view of the ring spring having two portions widened to increase the spring force.
Figure 4B:
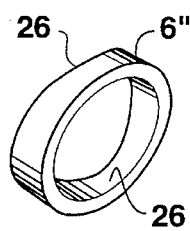
FIG. 4b shows a perspective view of the ring spring having two portions narrowed to decrease the spring force.

FIG. 4a shows ring spring 6' which has two portions 24 widened in order to increase the spring force while maintaining a uniform wall thickness, allowing the use of ordinary tubing for springs. The widened portions may be made by cutting a tube across its diameter with a cylindrical cutter of the appropriate diameter. FIG. 4b shows a ring spring 6" with portions 26 narrowed to decrease the spring force, the thinned portions resulting from the previously described method but with shorter springs being cut.

Figure 5:
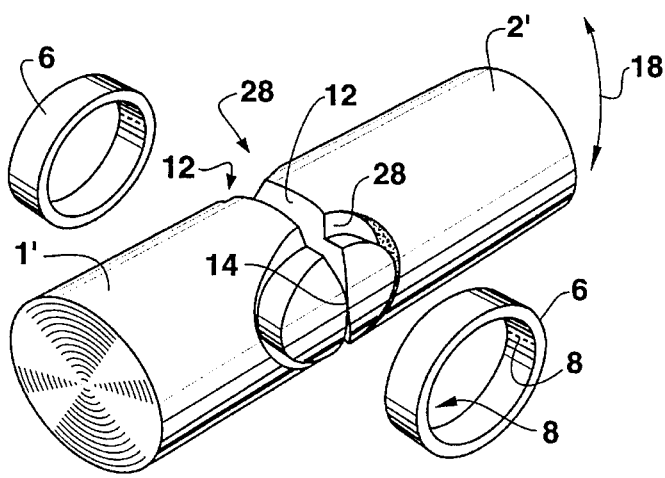
FIG. 5 shows a perspective view of a axially stiff link having wells for the ring springs.
Figure 6:
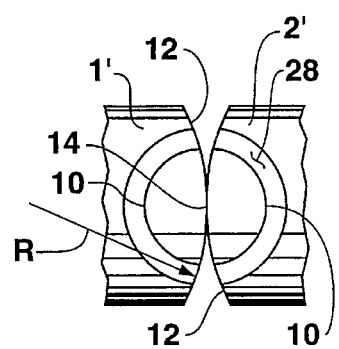
FIG. 6 shows an end view of the shaft rolling element of FIG. 5.

FIG. 5 shows a link between shaft segments 1' and 2' having wells 28. The wells are formed by removing material from the body of each shaft segment to form the ring spring engaging portion, onto which ring springs 6 are installed. Surface 12 of each shaft portion is given the desired cylindrical or other curvature, indicated by arrow R (FIG. 6), rolling line contact 14 allows link bending, indicated by the arrow 18, while rolling line contacts 10 are provided for the ring spring contacts 8. Well 28 allows the length of rolling line contact 14 to be equal to the full diameter of the shafts 1 and 2 thereby providing a large rolling contact area and reduced contact pressure.

The well construction method is easily applied to any of the link embodiments herein described, particularly to metals before or after hardening. The well method is also applicable with slightly greater difficulty to hard materials but is justified by simplicity and economy of construction, when it is desirable to have a well known thermal expansivity due to a single material used throughout the link, and when the compliance of a bonded or brazed joint is to be avoided.

FIG. 7 shows a link joint which allows primarily bending in direction 18 and secondarily allows torsional rotation 52, comprising shaft segments 1 and 2 into which are brazed shaft rolling elements 4'. Surfaces 13 may be flat or concaved and bear two cylindrical rolling elements 32 which have rolling line contacts 15 with shaft rolling elements 4', assembled by ring springs 6. Two rolling elements 32 counter-rotate when a small torsional rotation occurs, along with some scrubbing. Scrubbing is tolerable in optical apparatus, for example, during coarse adjustment of a linked member, after which continued fine adjustment is primarily by link bending in direction 18. Cylindrical rolling elements 32 may have opposing spherical ends with Hertzian contact 34, as in FIG. 8, to maintain a separation between rolling line contacts 15 on the two cylindrical rolling elements 32. Shorter rolling members scrub less but are also less rigid. Cylindrical rolling elements have a rigidity which increases slowly with increase of the radius. Large radii favor lower contact compressive stress and greater rigidity.

FIG. 9 shows a side view of the joint of FIG. 7.

FIGS. 10, 11 and 12 show a variant of the apparatus of FIG. 7 comprising all of the same parts, but with a larger radius R of rolling elements 36. The larger radius increases the rigidity of the rolling contact and provides kinematic stability of multijointed links. The contact stress is also reduced by the larger radius.

FIG. 13 shows the apparatus of FIG. 7 to which is added centering and stabilizing bar 38 comprising elastomer body 40 into which is molded hard insert 42. Bars 38 are held in place by contact with ring springs 6''' at the edge of hard insert 42. Hard insert 42 distributes alignment and centering forces on the rolling elements of the joint. The shear compliance of the elastomer portion of the alignment insert is sufficient for the angular excursions typically encountered in optical apparatus without imposing significant moments on the link. FIG. 13 also shows the ring spring 6''' with an extension 44 on which is affixed thrust bearing 46 to contact near the center of the end of each rolling element 32, thereby preventing axial movement of said elements during dynamic operation.

Figure 15:
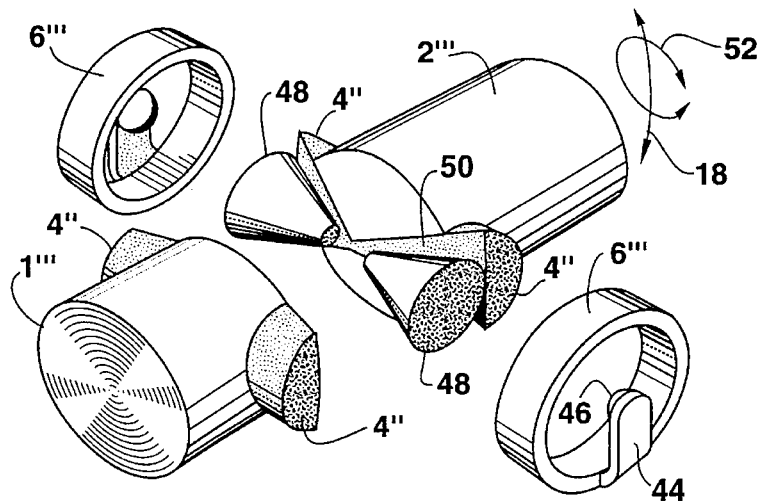
FIG. 15 shows an exploded view of an axially stiff link with conic rolling element.

FIG. 15 shows a variant of the apparatus of FIGS. 7 or 13 which is primarily for link motion 52 and secondarily for link bending 18. The variant comprises shaft segments 1''' and 2''', rolling elements 48 that are frustums of cones, surface 50 that is shallowly conical, shaft rolling elements 4'' and the ring springs 6''' of FIG. 13. This variant of the joint has negligible resistance to torsional rotation, and accommodates bending with some sliding friction. Fabrication follows previously described methods with modifications suitable to conical elements.

Figure 16:
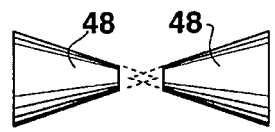
FIG. 16 shows a face view of the two conic rolling elements of FIG. 15.

Joints similar to FIG. 15 that accommodate both bending and torsional rotation have conical rolling elements each with an included angle somewhere between zero and the angle of the cone of FIG. 15 which has its projected apex point on the centerline of the link shaft, exemplified by the cone frustums of FIG. 16.

Figure 17:
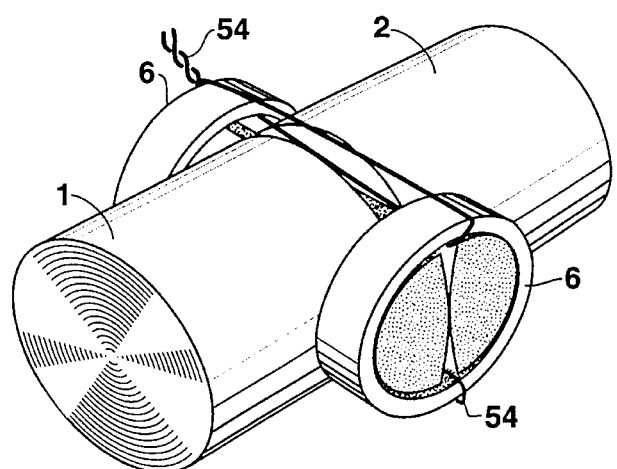
FIG. 17 shows a perspective view of an axially stiff link employing safety wires.

FIG. 17 shows safety wire 54 used to retain ring springs 6 on links which only bend. Safety wire is elastomer coated for acoustical damping.

Figure 18:
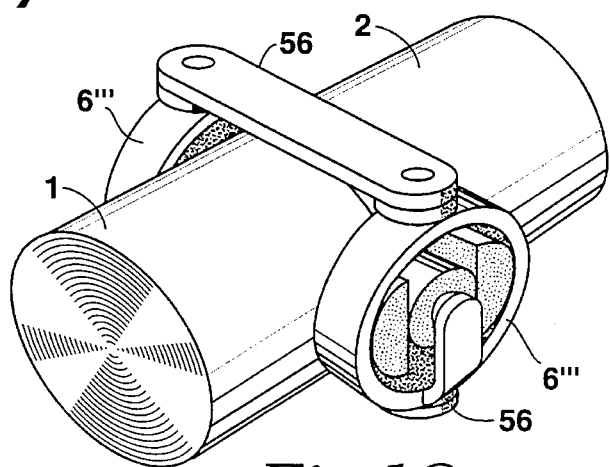
FIG. 18 shows a perspective view of an axially stiff link employing retainer bars.

FIG. 18 shows retainer bars 56 preferred to retain elements of link joints that permit bending and torsional rotation, and in which the taper of the rolling member results in a force component on the member in a direction radially outward from the link shaft axis. Bars 56 may be straight, and alternatively, may be waved to act as spring members.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An axially stiff link comprising:

two shaft segments;

a shaft rolling element with transverse plain-curved ends attached to each of the shaft segments, the shaft rolling elements being in rolling line contact with each other, the shaft rolling elements having a curved transverse ring spring engaging portion on opposing sides of the shaft segments, a ring spring for encompassing adjacent ring spring engaging portions, engaging them by rolling line contact and preloading the shaft rolling elements.

2. An axially stiff link as in claim 1 wherein, the ring spring is distorted to an elipical circumference when engaging the ring spring engaging portions of the shaft segments.

3. An axially stiff link as in claim 1 wherein the shaft rolling element ring spring engaging portion and the shaft rolling element are on opposing sides of one piece of material attached to the shaft segments.

4. An axially stiff link as in claim 1 wherein, the ring spring has a beveled edge for a small area of contact with the shaft segments.

5. An axially stiff link as in claim 1 wherein, the ring spring has a narrowed portion to allow the ring spring to be deformed with less force.

6. An axially stiff link as in claim 1 wherein, the ring spring has a widened portion to allow the ring spring to increase its spring force.

7. A two axis axially stiff link comprising, three shaft segments, a first shaft segment having a shaft rolling element with a transverse plain-curved end, a second shaft segment having a shaft rolling element with two transverse plain-curved ends, one at each end of the shaft segment, and one transverse plain-curved end being perpendicular to the other, a third shaft segment having a shaft rolling element with a transverse plain-curved end, the shaft rolling elements having a curved transverse ring spring engaging portions on opposing sides of the shaft segments, a ring spring encompassing adjacent ring spring engaging portions, between the first and second shaft segments and between the second and third shaft segments, engaging them by rolling line contact and preloading the shaft rolling elements.

* * * * *